United States Patent
Westerling et al.

(10) Patent No.: US 6,629,458 B1
(45) Date of Patent: Oct. 7, 2003

(54) DEVICE IN A LEVEL GAUGING SYSTEM

(75) Inventors: Jan Westerling, Linköping (SE); Magnus Håkansson, Linköping (SE)

(73) Assignee: Saab Marine Electronics AB, Göteborg (SE)

( * ) Notice: Subject to any disclaimer, the term of this patent is extended or adjusted under 35 U.S.C. 154(b) by 0 days.

(21) Appl. No.: 10/252,830

(22) Filed: Sep. 24, 2002

(51) Int. Cl.$^7$ ............................................... G01F 23/284
(52) U.S. Cl. .................... 73/290 V; 73/290 R
(58) Field of Search .................... 73/290 R, 290 V, 73/649, 596, 584; 342/107, 145, 124

(56) References Cited

U.S. PATENT DOCUMENTS

| | | | |
|---|---|---|---|
| 4,851,855 A | | 7/1989 | Tsukamoto et al. .. 343/700 MS |
| 5,614,831 A | * | 3/1997 | Edvardson .................. 324/642 |
| 5,958,557 A | | 9/1999 | Naor ......................... 428/174 |
| 2002/0040596 A1 | * | 4/2002 | Muller et al. ............. 73/290 V |

FOREIGN PATENT DOCUMENTS

| | | |
|---|---|---|
| DE | 3201104 | 8/1983 |
| JP | 10-197617 | 7/1998 |

OTHER PUBLICATIONS

R. Garp et al., Microstrip Antenna Design Handbook, Artech House 2001.

* cited by examiner

*Primary Examiner*—Hezron Williams
*Assistant Examiner*—Rodney Frank
(74) *Attorney, Agent, or Firm*—Swidler Berlin Shereff Friedman, LLP

(57) ABSTRACT

The present invention relates to a device in a level gauging system comprising an antenna using radar waves to gauge a level of a surface of a fluid kept in a container. The antenna is arranged above the fluid surface and comprises a plane surface facing the fluid surface and being substantially parallel with the fluid surface. The plane surface has means for transmitting radar waves towards the fluid surface and means for receiving reflected radar waves from the fluid surface in order to gauge the fluid level. The antenna comprises a radome which at least partially covers the plane surface and is shaped such that condensed fluid is directed away from the antenna by force of gravity. A thermally insulating filling material is provided between the radome and the plane surface.

8 Claims, 2 Drawing Sheets

DEVICE IN A LEVEL GAUGING SYSTEM

FIELD OF THE INVENTION

The present invention relates generally to an antenna using radar waves in a level gauging system and, more particularly, to an antenna comprising a plane surface from which radar waves are transmitted towards a surface of a fluid kept in a container and to which reflected radar waves are received from the fluid surface in order to gauge the fluid level in the container.

DESCRIPTION OF THE RELATED ART

In level gauging systems using radar waves for gauging the fluid level in a container, such as a tank on a ship or the like, planar antennas are commonly used today since they are fairly cheap to manufacture. These antennas are usually mounted in an opening in the lid of the container and comprise a plane surface facing the surface of the fluid and having means for transmitting/receiving radar waves in order to gauge the fluid level. The plane surface of the antenna forms a horizontal cold wall which causes e.g. water vapour to condensate on the plane surface, especially if the container is a heated tank. Condensed fluid on the antenna surface leads to disturbed propagation of the radar waves and/or absorbed radar waves. Therefore, planar antennas are very sensitive for environments which are strongly condensing.

A radar wave type liquid level gauge is known from JP 10-197617, in which a planar antenna is provided with a conically formed protective board (radome) on which paraffin is condensed through evaporation of stored oil. The board is disposed such that the top of the cone faces the antenna at the shortest distant, i.e. the top of the cone faces the antenna. Due to the conical form of the protective board, the condensate is caused to flow down to the peripheral part of the board. The protective board is a separate unit placed at a certain distance from the antenna and does not form a part of the antenna.

The solution described above deals with the problem of leading condensate away from the antenna. There is, however, a need for a solution which, besides leading the condensate away from the antenna, minimizes the tendency of e.g. water vapour to condensate on the plane surface of the antenna.

Antennas provided with a radome placed at a distance from the antenna leaving a space filled with air between the antenna surface and the radome, may have a problem with the appearance of condensed fluid in that space if, there by any chance occurs a leakage between either the radome and the container or the antenna and the surroundings. For example DE 3 201 104 shows an antenna provided with a radome, where the antenna is upwards directed having an opening between the antenna and the radome at the edge of the radome in order to lead condensed fluid out from the space between the antenna and the radome. There is, however, a need for a solution which is applicable in a level gauging system, where the antenna is directed downwards towards the fluid surface.

The present invention is directed to overcoming, or at least reducing the effects of one or more of the problems set forth above.

SUMMARY OF THE INVENTION

In one aspect of the present invention an antenna is provided, which uses radar waves for measuring the fluid level in a container. The antenna is provided with a radome arranged and formed such that to lead condensate away.

In another aspect of the invention an antenna is provided, which uses radar waves for measuring the fluid level in a container. The antenna is provided with a protecting material having thermally insulating characteristics.

In still another aspect of the invention an antenna is provided, which uses radar waves for measuring the fluid level in a container. The antenna is provided with a radome forming a space between the antenna and the radome. The antenna is further provided with a filling material provided in said space between the antenna and the radome and being tightly fit between the antenna and the radome such, that it prevents condensed fluid to enter the space in case of a leakage between either the radome and the container or the antenna and the surroundings.

In yet another aspect of the invention an antenna is provided, which uses radar waves for measuring the fluid level in a container. The antenna is provided with a radome forming a space between the antenna and the radome, in which space a filling material is provided. The radiation of radar waves from the antenna is optimised in consideration of the radome and the filling material, why the thickness of the radome varies along the length of the radome.

BRIEF DESCRIPTION OF THE DRAWINGS

The invention may be understood by reference to the following description taken in conjunction with the accompanying drawings, in which same reference numerals are referring to the same detail.

Figure 1:
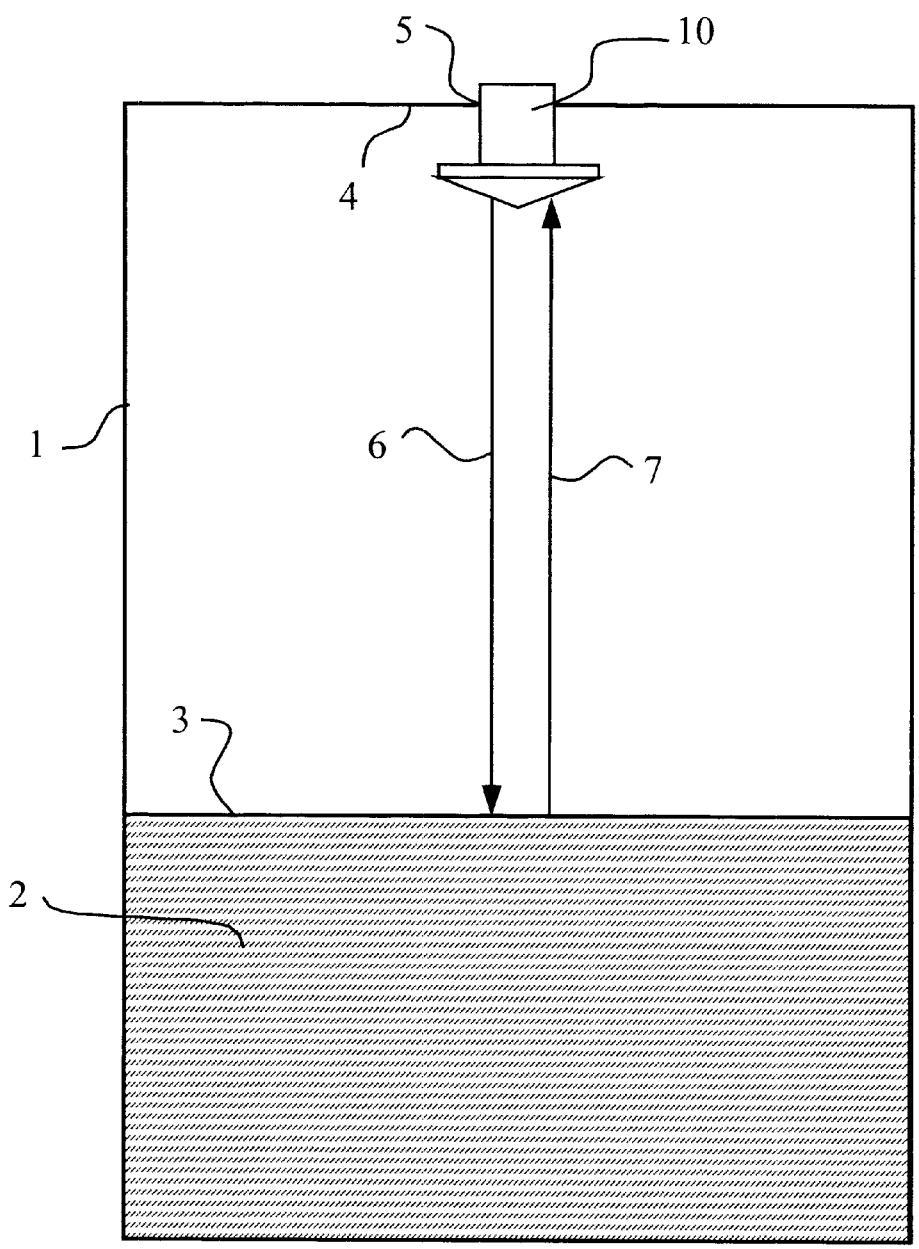
FIG. 1 is a perspective view of a level gauging system.

While the invention is susceptible to various modifications and alternative forms, specific embodiments thereof have been shown by way of example in the drawings and are herein described in detail. It should be understood, however, that in the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

FIG. 1 shows a fluid level gauging system using radar waves for measuring the fluid level in a container 1. The container 1 contains a fluid 2 and can e.g. be a tank on a ship, in a process industry or a tank in an oil refinery. The fluid may be a liquid such as oil, a gas or pulverized solid material such as sand or stone powder. The system comprises a planar antenna 10 which is mounted in an opening 5 in a lid 4 of the container 1. The antenna 10 is directed against a fluid surface 3 and arranged to transmit radar waves towards the fluid surface 3, denoted with arrow 6, and to receive reflected radar waves from the fluid surface 3, denoted with arrow 7. The system further comprises a radar unit (not shown) in which the radar waves are generated Referring now to FIG. 2, the antenna 10 comprises a transmission line 11 and a plane surface 12. Planar antennas are well-known in the art and are not described in detail herein, see for example "Microstrip Antenna Design Handbook" by R. Garg, P. Bharita, I Bahl and A. Ittipiboon, Artech House 2001, which is hereby incorporated as reference. Microstrip antenna is a synonym of planar antenna. The plane surface 12 comprises means for transmitting and receiving radar waves which are fed by the transmission line 11 from the radar unit.

Figure 2:
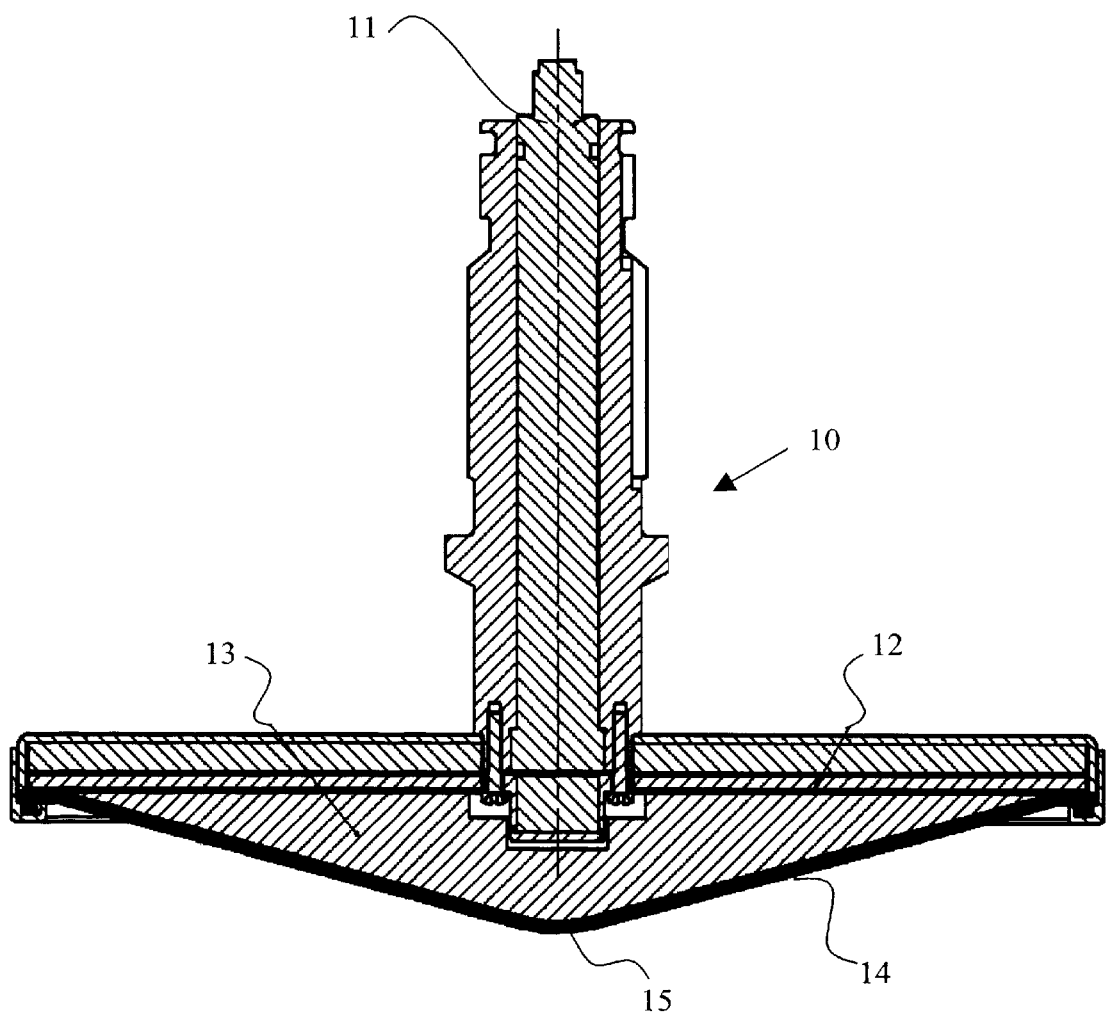
FIG. 2 illustrates a perspective view in cross-section of a preferred embodiment of an antenna according to the present invention.

The plane surface 12 is provided with a radome 14 which is, in the preferred embodiment shown in FIG. 2, formed as a cone with the top of the cone 15 facing the liquid surface 3. The condensate is, therefore, caused by force of gravity to flow along the envelope surface of the cone to the top of the cone 15, where it drips off. This means that the condensate is caused to drip off where it effects the propagation of the radar waves the least.

A distance material 13 having thermally insulating characteristics is arranged in the space between the plane surface 12 and the radome 14. The material is entirely filling this space and thereby making the plane surface 12 and the radome 14 to a mechanically strong integrated unit. The material 13 is a material having good thermally insulating and mechanically good characteristics, but which do not have an effect on the electrical characteristics of the antenna 10, examples of such a material are rohacell® or divinycell®. The appearance of condensed fluid on the radome surface will be reduced when such a material 13 having thermally insulating characteristics is placed between the plane surface 12 and the radome 14. Further, the problem with the appearance of condensed fluid in the space between the plane surface 12 and the radome 14 is eliminated with a device where this space is filled by a material, other than air. Still further, the mechanically strong integrated unit according to the present invention, may easily be mounted in a pressurized container, e.g. a tank containing gas, without having the radome collapsed.

The radome 14 can e.g. be a plastic solid piece or just a film resistant of chemicals which the material 13 is coated with. Usually the radome 14 is anti-statically treated. This is especially important when the antenna needs to be overvoltage protected, e.g. in environments subject to explosion hazards.

The embodiment shown in FIG. 2 is just one example of how the radome 14/material 13 may be formed. The skilled person understands that other shapes are possible, e.g. a drop-shaped radome or a double cone-shaped radome. The important factor is that the radome is formed such that it leads condensate away by force of gravity. The radome 14 is in the preferred embodiment covering the whole of the plane surface 12, but could just as well cover only a part of the plane surface 12 if desired.

In another embodiment of the present invention, the radome 14 is a homogeneous filled e.g. cone, having the same mechanical strength and having the same good effect of leading condensate away as the preferred embodiment described above. This embodiment would be cheaper to manufacture, but with a little less thermally insulating characteristics than the preferred embodiment.

The electrical characteristics of the antenna 10 is designed, and the radiation of radar waves from the antenna 10 is optimised, in consideration of the radome 14 and the distance material 13. This means that the functionality of the antenna 10 is not effected or negligible effected by the inventive radome 14 and distance material 13. Therefore, the thickness of the radome 14 varies (not shown), and thus also the thickness of the material 13, as a function of the distance to a point (not shown), which in the preferred embodiment is defined where the center axes of the transmission line 11 crosses an imagined line horizontally aligned with the plane surface 12. This distance is henceforward called the radius of the radome. The variation of the thickness may be continuous or gradual. The variation of the thickness of the radome depends of course on the requirements of the electric characteristics and the radiation of radar waves, but just as an example would a thickness of 1 mm increase to 2 mm when the radius is decreased with half the length of the radius.

What is claimed is:

1. An antenna in a level gauging system using radar waves to gauge a level of a surface of a fluid kept in a container, the antenna being arranged above the fluid surface and comprising:

a plane surface facing the fluid surface, being substantially parallel with the fluid surface and having means for transmitting radar waves towards the fluid surface and means for receiving reflected radar waves from the fluid surface in order to gauge the fluid level;

a radome which at least partially covers the plane surface and shaped such that condensed fluid is directed away from the antenna by force of gravity, characterized in that, a thermally insulating filling material is provided between the radome and the plane surface.

2. An antenna according to claim 1, wherein the filling material is arranged to provide a seal between the plane surface and the radome in order to prevent condensed fluid to enter between the radome and the plane surface in case of a leakage.

3. An antenna according to claim 1, wherein the radome is conically formed with the top of the cone facing the fluid surface.

4. An antenna according to claim 1, wherein the radome has an envelope surface along which the thickness of the radome is variable in order to optimise the radiation of radar waves from the antenna.

5. An antenna according to claim 1, wherein the radome consist of a material of anti-static quality.

6. An antenna according to claim 1, wherein the radome consists of a polymeric material.

7. An antenna according to claim 1, wherein a chemical resistant film provides the radome coating the filling material.

8. An antenna according to claim 1, wherein the filling material consists of the same material as the radome and thus forms a homogeneous filled unit.

* * * * *